United States Patent
Müller et al.

(10) Patent No.: US 9,855,864 B2
(45) Date of Patent: Jan. 2, 2018

(54) LONGITUDINAL ADJUSTMENT MECHANISM FOR A SEAT, MECHANISM FOR ADJUSTING THE INCLINATION OF A SEAT PORTION, VEHICLE SEAT

(71) Applicant: Johnson Controls Components GMBH & CO. KG, Kaiserslautern (DE)

(72) Inventors: Sascha Müller, Kaiserslautern (DE); Andreas Kinzer, Homburg (DE); Eckhard Kirch, Bann (DE); Joachim Mühlberger, Obersülzen (DE)

(73) Assignee: JOHNSON CONTROLS COMPONENTS GMBH & CO. KG, Kaiserslautern (DE)

( * ) Notice: Subject to any disclaimer, the term of this patent is extended or adjusted under 35 U.S.C. 154(b) by 254 days.

(21) Appl. No.: 14/396,444

(22) PCT Filed: Apr. 16, 2013

(86) PCT No.: PCT/EP2013/057862
§ 371 (c)(1),
(2) Date: Oct. 23, 2014

(87) PCT Pub. No.: WO2013/160146
PCT Pub. Date: Oct. 31, 2013

(65) Prior Publication Data
US 2015/0084389 A1 Mar. 26, 2015

(30) Foreign Application Priority Data

Apr. 25, 2012 (DE) .................. 10 2012 008 101
Jul. 20, 2012 (DE) .................. 10 2012 014 379

(51) Int. Cl.
*B60N 2/04* (2006.01)
*B60N 2/62* (2006.01)
*B60N 2/18* (2006.01)

(52) U.S. Cl.
CPC .......... *B60N 2/045* (2013.01); *B60N 2/1821* (2013.01); *B60N 2/1853* (2013.01); *B60N 2/62* (2013.01)

(58) Field of Classification Search
CPC ......... B60N 2/045; B60N 2/1821; B60N 2/62
(Continued)

(56) References Cited

U.S. PATENT DOCUMENTS 2,962,084 A  11/1960  Pickles
6,382,491 B1  5/2002  Hauser et al.

FOREIGN PATENT DOCUMENTS

DE  2715547 A1  10/1978
DE  3527180 A1  2/1987
(Continued)

OTHER PUBLICATIONS

Japanese Office Action for Japanese Application No. 2015507465 dated Oct. 27, 2015.
(Continued)

*Primary Examiner* — Anthony D Barfield
(74) *Attorney, Agent, or Firm* — The Dobrusin Law Firm, P.C.

(57) ABSTRACT

An adjustment unit for a vehicle seat in a vehicle is disclosed. Said adjustment unit comprises a longitudinal adjustment mechanism for adjusting the vehicle seat along a direction of travel of the vehicle, said longitudinal adjustment mechanism comprising a first rocker that is mounted in such a way as to be rotatable about a transverse direction extending perpendicular to the direction of travel of the vehicle.

4 Claims, 5 Drawing Sheets

(58) Field of Classification Search
USPC .............................. 297/340, 344.13; 248/421
See application file for complete search history.

(56) References Cited

FOREIGN PATENT DOCUMENTS

| | | |
|---|---|---|
| DE | 4031568 C1 | 4/1992 |
| DE | 19641652 C1 | 3/1998 |
| DE | 19943573 A1 | 3/2001 |
| DE | 10044063 A1 | 3/2002 |
| DE | 2020004020657 U1 | 11/2005 |
| DE | 102005022645 B3 | 9/2006 |
| DE | 102005023936 A1 | 11/2006 |
| DE | 102007000292 A1 | 12/2007 |
| DE | 102008041128 A1 | 2/2010 |
| FR | 2761833 A1 | 10/1998 |
| GB | 505703 A * | 5/1939 |
| JP | H01-114838 U | 8/1989 |
| JP | H0939632 A | 2/1997 |
| JP | 2002345589 A | 12/2002 |

OTHER PUBLICATIONS

International Preliminary Report on Patentability for Application No. PCT/EP2013/057862, dated Oct. 28, 2014.
International Search Report for Application No. PCT/EP2013/057863, dated Jul. 6, 2013.
Search Report for application No. PCT/EP2013/057862 dated Nov. 6, 2013.
Office Action for Chinese Application No. 201380021747.9 dated Dec. 23, 2015.
Second Office Action for Chinese Application No. 201380021747.9 dated Aug. 11, 2016.
German Office Action for German Application No. 102012014379.6 dated Jun. 18, 2015.
English Translation of German Office Action for German Application No. 102012014379.6 dated Jun. 18, 2015.
Chinese Office Action for Chinese Application No. 201380021747.9 dated Feb. 8, 2017.
Korean Office Action for Korean Application No. 10-2014-7033120 dated Oct. 29, 2015.

* cited by examiner

LONGITUDINAL ADJUSTMENT MECHANISM FOR A SEAT, MECHANISM FOR ADJUSTING THE INCLINATION OF A SEAT PORTION, VEHICLE SEAT

PRIOR ART

The present invention relates to a seat longitudinal adjustment mechanism for vehicle seats. It is generally known from the prior art to design the seats vehicle to be adjustable in the direction of travel by means of a seat longitudinal adjustment mechanism. Customarily, such a seat longitudinal adjustment mechanism comprises a rail system which runs horizontally on the vehicle floor or forward rising or dropping at an angle and consists of a seat-mounted upper rail and body-mounted lower rail, wherein the upper rail and the lower rail are mounted displaceably on each other by means of spherical or rolling bodies. A locking unit ensures that the vehicle seat is locked in a desired use position. Between the upper rail and a vertical seat surface of the vehicle seat, such vehicle seats furthermore have a seat surface inclination adjuster which permits an adjustment of the inclination of the seat surface.

A drawback of is seat longitudinal adjustment mechanism based on a rail system is that a flat underlying surface is required. In particular for rear seats, an integration of a seat longitudinal adjuster in a manner compact in terms of construction space is therefore not possible.

DISCLOSURE OF THE INVENTION

It is the object of the present invention to provide a seat longitudinal adjustment mechanism which does not require a rail system running horizontally on the vehicle floor or forward in a manner rising or dropping at an angle.

This object is achieved by a seat longitudinal adjustment mechanism for a vehicle seat, wherein the seat longitudinal adjustment mechanism comprises a first rocker which is mounted rotatably about a transverse direction which is perpendicular to the direction of travel of the vehicle. A front end of the first rocker acts preferably in the manner of a rotary hinge below a seat surface of the vehicle seat while a rear end of the first rocker preferably acts in the manner of a rotary hinge on a body-mounted substructure of the vehicle seat. The vehicle seat is adjusted by a change in length of the first rocker and/or by a change in angle of the orientation of the first rocker. It is conceivable for the rocker to comprise a spindle drive or a piston-cylinder drive for the change in length. A further subject matter of the present invention is as vehicle seat having a seat longitudinal adjustment mechanism according to the invention.

A further subject matter or a preferred embodiment of the present invention is a seat surface inclination adjustment device for the seat surface of a vehicle seat, wherein the inclination adjustment mechanism comprises a second rocker which is mounted rotatably about a transverse direction which is perpendicular to the direction of travel of the vehicle. An adjustment of the inclination at least of a front part of the vehicle seat takes place by a change in length of a spindle and/or by a longitudinal movement of the spindle and/or by a rotation of the second rocker. The front end of the second rocker is guided in a longitudinally displaceable manner in particular in a guide slot below the front part of the seat surface. A further subject matter of the present invention is a vehicle seat having an inclination adjustment mechanism according to the invention.

Further details, features and advantages of the invention emerge from the drawings and from the description below of preferred embodiments with reference to the drawings. The drawings here illustrate merely exemplary embodiments of the invention which do not restrict the essential concept of the invention.

DESCRIPTION OF THE FIGURES

In the various figures, identical parts are always provided with the same reference numbers and are therefore generally also only referred to or mentioned once in each case.

Figure 1A:
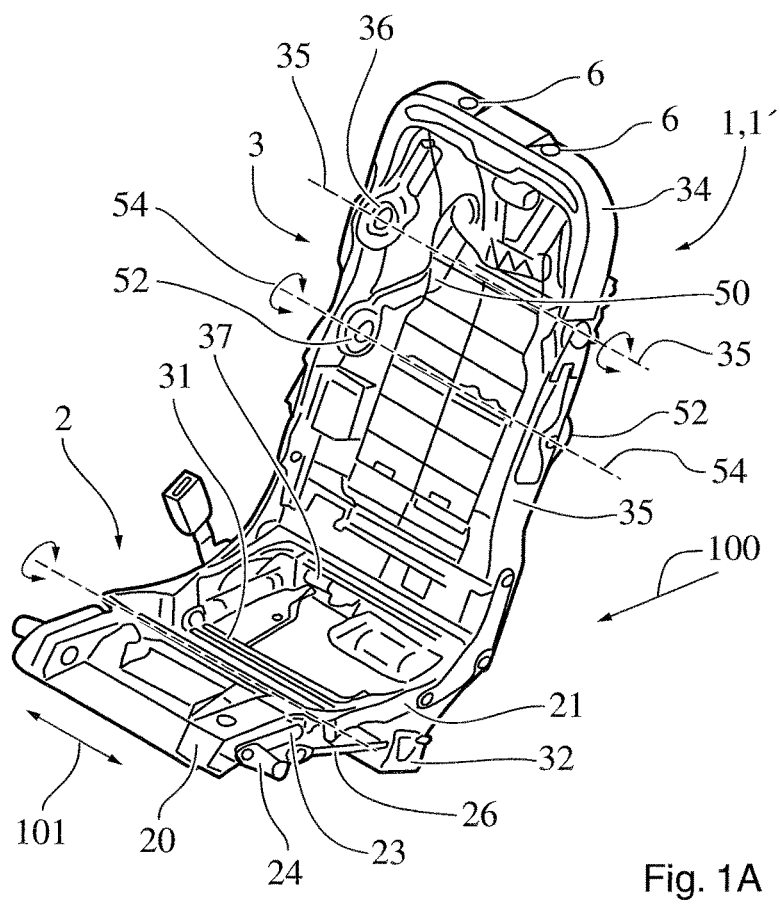
FIGS. 1A and 1B illustrate schematic perspective views of a vehicle seat 1 for a motor vehicle. In particular, a vehicle seat 1 for the vehicle rear of the motor vehicle is involved here. The vehicle seat 1 comprises a seat part 2, and a backrest 3. The seat part 2 defines a seat surface for a vehicle occupant and comprises a front part 20, and a main part 21. The main part 21 is mounted in the manner of a rotary hinge on a first rocker 31. The lower side of the front part 20 has a slotted guide 23 in which a first end of a second rocker 24 is mounted in the manner of a rotary hinge about a transverse axis which extends along a transverse direction 101 which is perpendicular to the direction of travel 100, wherein the first end is mounted in a longitudinally displaceable manner in the direction of travel 100 in the slotted guide 23. The second end of the second rocker 24 is connected in the manner of a rotary hinge to a holder 25 fastened to the vehicle floor. Furthermore, a first end of a spindle 26 is connected rotatably to the second rocker 24.
Figure 1B:
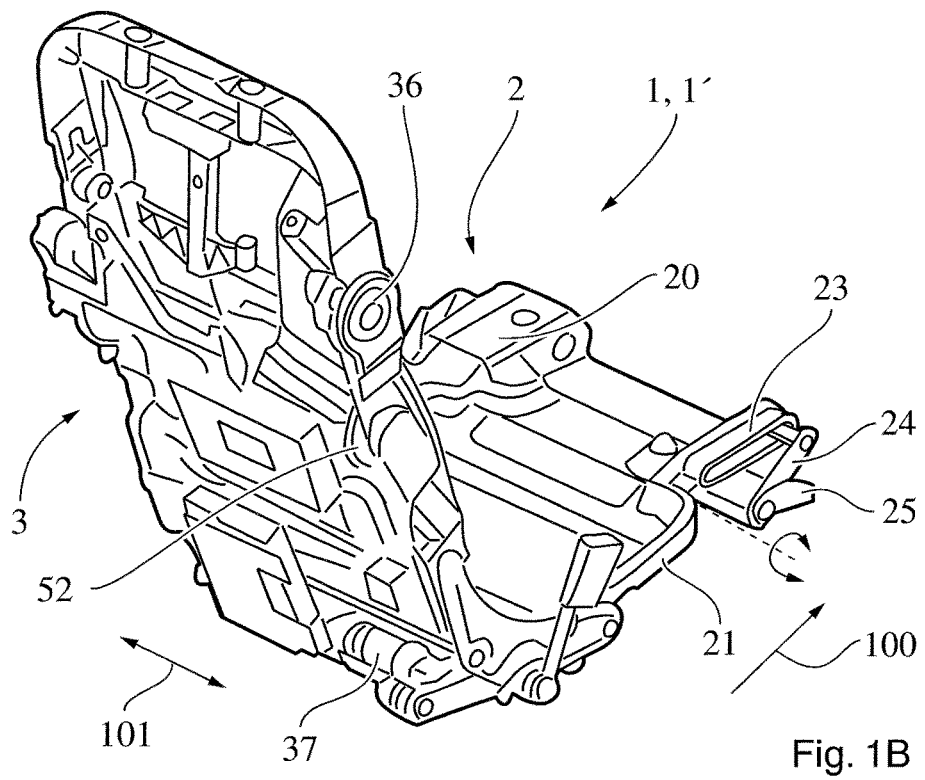

The main part 21 of the vehicle seat 1 is fastened via a first rocker 31 to a body-mounted substructure 40 of the vehicle seat 1. A first end of the first rocker 31 is connected rotatably to the main part 21 while the second end of the first rocker 31 is fastened rotatably to the substructure 40. The first rocker 31 preferably comprises a longitudinal adjustment unit for adjusting the length of the first rocker 31, for example via a cylinder-piston guide or a spindle drive. The first rocker 31 is therefore part of a seat longitudinal adjustment mechanism for the vehicle seat 1, since a change in length of the first rocker 31 brings about a movement of the seat part 2 in the direction of travel 100. Furthermore, the angle of the first rocker 31 in relation to the substructure 40 can preferably be changed via a drive 37, and therefore the height of the seat part 2 can be changed via a change in angle of the first rocker. The first rocker 31 therefore preferably also forms part of a adjustment mechanism for the vehicle seat 1.

The position of the second rocker 24 relative to the substructure 40 can be changed via a further drive 32. The inclination of the front part 20 can be changed in this manner. Furthermore, the inclination of the seat surface of the seat part 2 is thereby changed. The drive 32 with the spindle 26 is therefore part of a seat surface inclination adjustment mechanism for the vehicle seat 1.

The vehicle seat 1 furthermore has a backrest inclination adjustment mechanism. The backrest inclination adjustment mechanism comprises a fourth rocker 50, the first end of which is connected in the manner of a rotary hinge to the backrest 3 and the second end of which is connected in the manner of a rotary hinge to a vehicle-mounted retaining clamp 51. The first end of the fourth rocker 50 is connected to the backrest 3 about an axis of rotation 54 in the manner of a rotary hinge via an adjustment unit 52, in particular a wobble mechanism or a latching pawl adjuster. The adjustment unit 52 here permits a change in angle between the backrest 3 and the fourth rocker 50, as a result of which the inclination of the backrest 3 changes. The second end of the fourth rocker 50 is preferably fastened in a slotted guide 53 of the retaining clamp 51. The adjustment unit 52 preferably has a drive, and therefore a motor-assisted adjustment of the backrest inclination is made possible.

The backrest 3 of the vehicle seat 1 preferably comprises a backrest main part 33 and a backrest upper part 34, wherein the backrest main part 33 and the backrest upper part 34 are connected to each other in the manner of a rotary hinge via a common second pivot axis 35. The second pivot axis 35 runs parallel to the transverse direction 101. The backrest main part 33 and the backrest upper part 34 are coupled to each other in the region of the second pivot axis 35, in particular by means of a further adjustment unit 36, in such manner that an adjustment of the further adjustment unit 36 brings about a change in the angle between the backrest main part 33 and the backrest upper part 34 about the second pivot axis 35. The further adjustment unit 36 comprises in particular a motor-driven wobble mechanism or a latching pawl adjuster. The further adjustment unit 36 is in particular part of an adjustment of the curvature of the backrest. A headrest 4 is connected to the upper end of the vehicle seat 1 and in particular of the backrest upper part 34. Preferably, for this purpose, two retaining rods 5 of the headrest 4 are fastened in guide bushings 6 of the backrest 3. The headrest 4 is provided in particular in a height-adjustable manner in the guide bushings 6, and therefore the guide bushings 6 are in particular part of a headrest height adjuster.

Figure 2A:
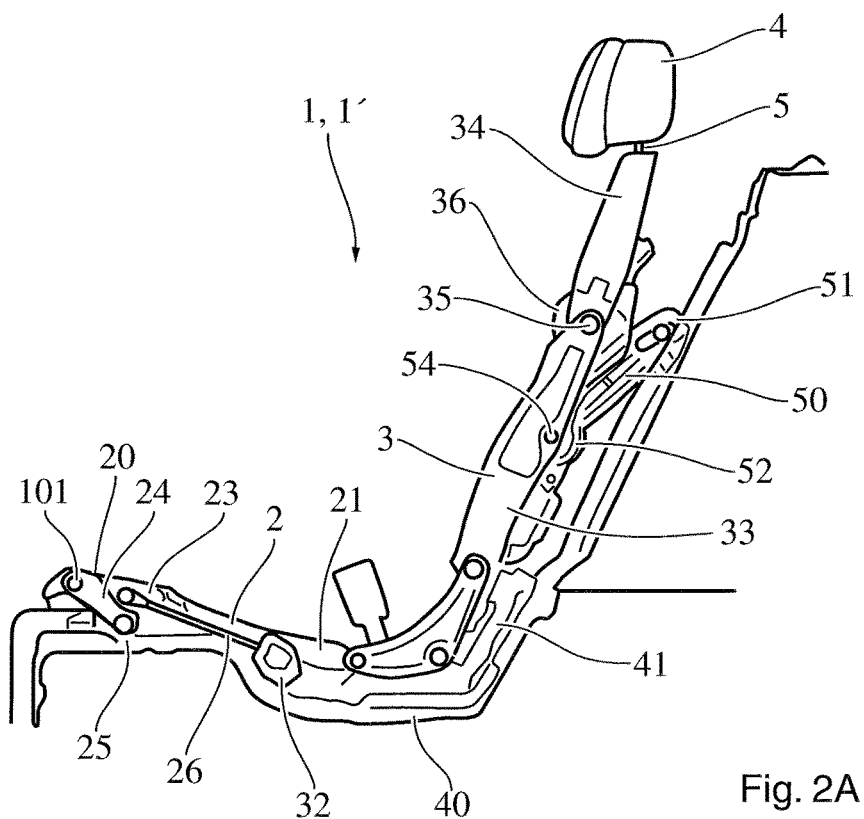
Figure 2B:
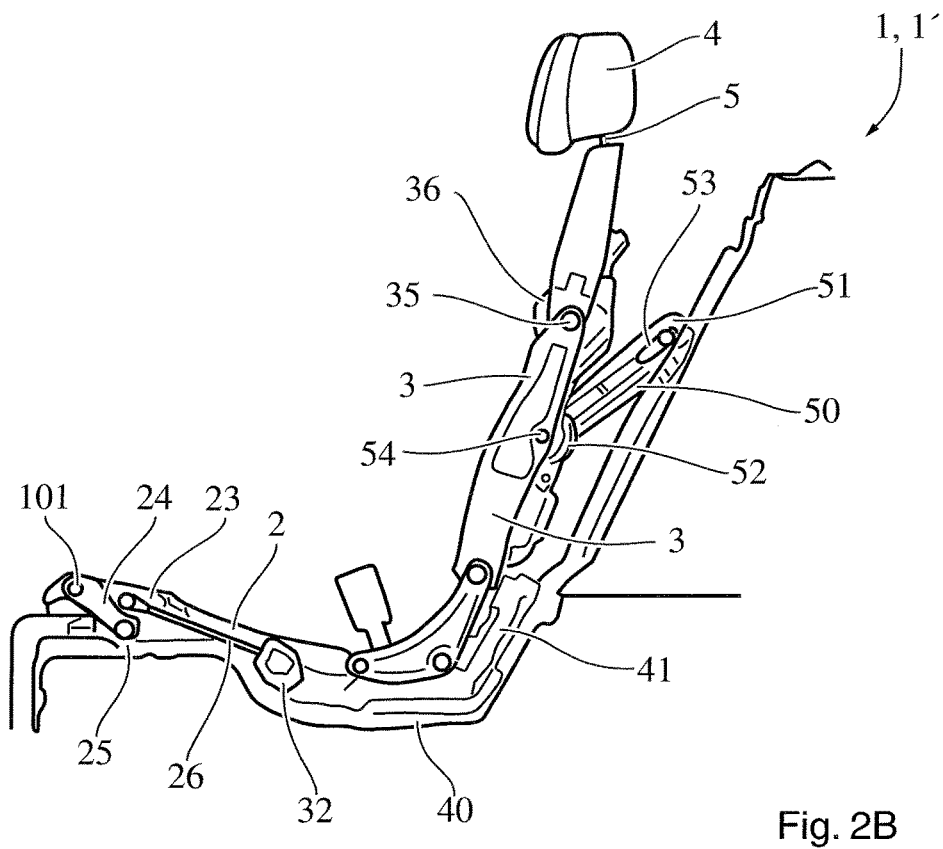
Figure 2C:
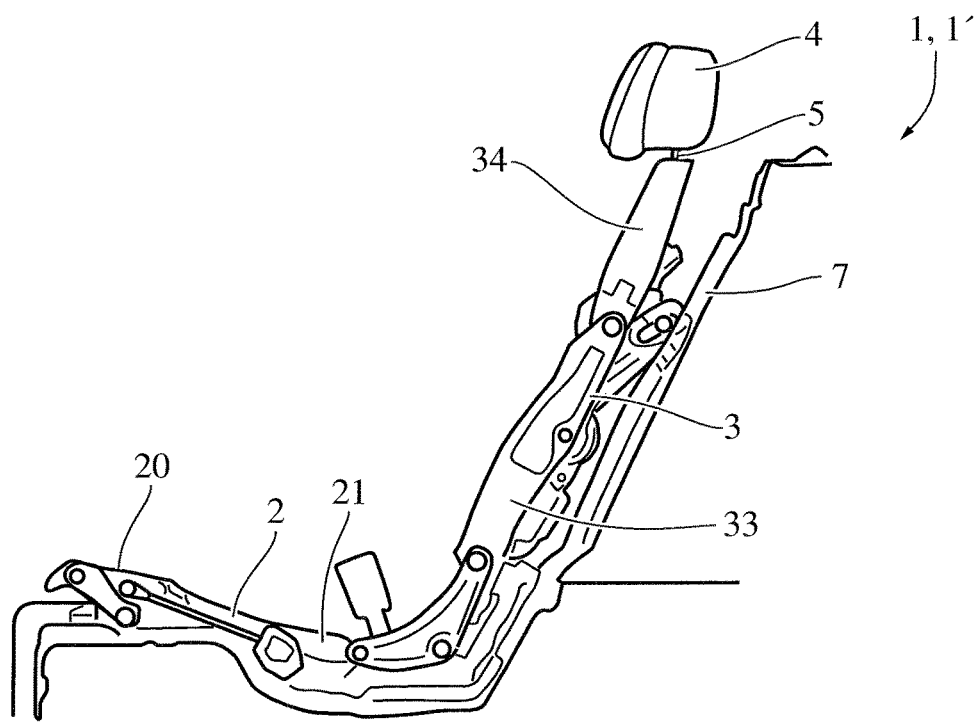
Figure 2D:
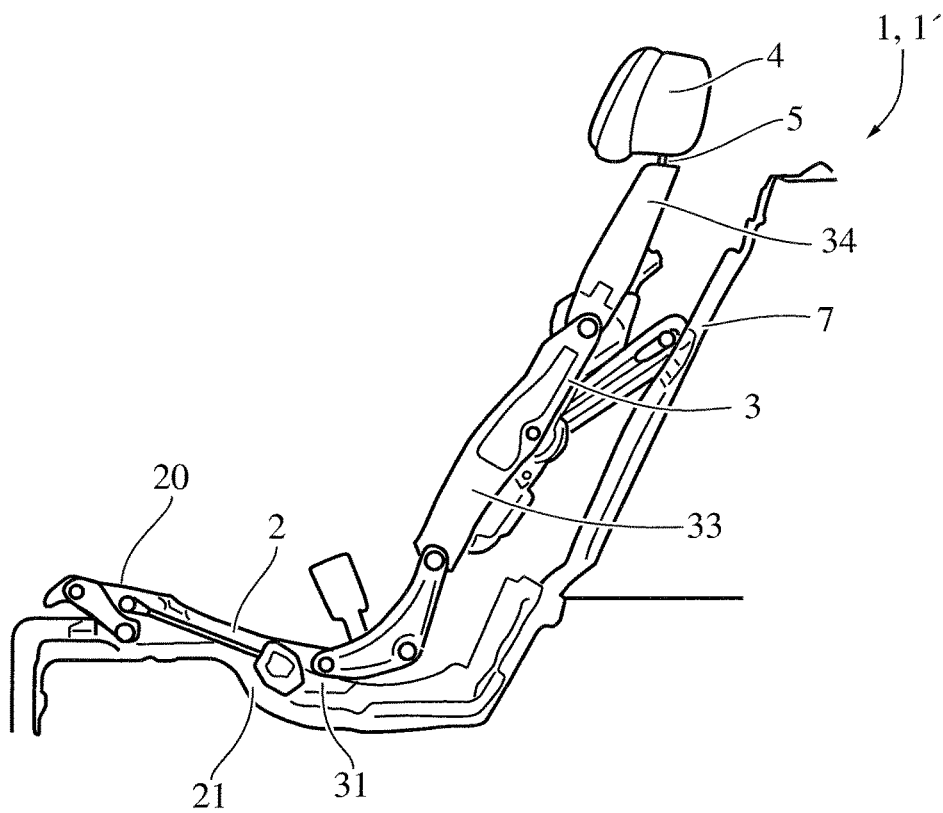
Figure 2E:
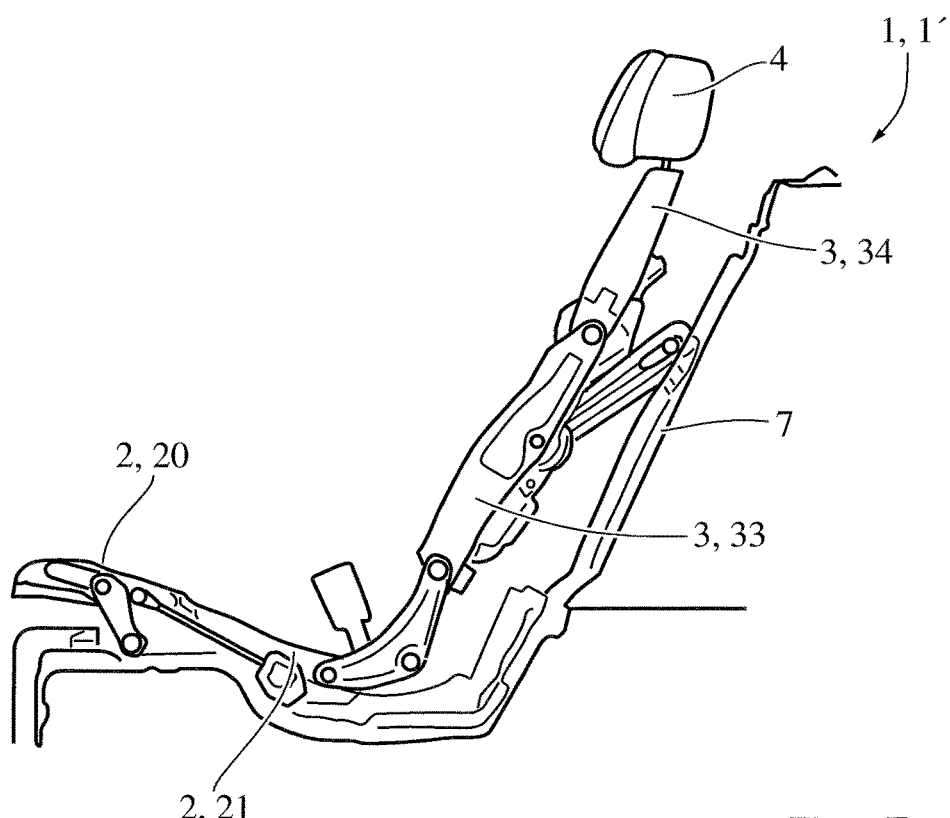

FIGS. 2A to 2E illustrates side views of the vehicle seat 1 according to the invention, in which the vehicle seat 1 is arranged in different positions. FIG. 2A illustrates a starting position of the vehicle seat 1. In FIG. 2B, the backrest 3 is shifted by means of the backrest inclination adjustment mechanism into a position pivoted forward in relation to the starting position. In FIG. 2C, the backrest 3 is shifted by means of the backrest inclination adjustment mechanism into a position pivoted back in relation the starting position. In FIG. 2D, the seat part 2 is shifted by means of the seat longitudinal adjustment mechanism. into a position shifted forward in relation to the starting position, as a result of which at the same time the angle of inclination of the backrest main part 33 has changed in relation to the starting position. The backrest main part 33 is in a flatter orientation. The backrest upper part 34 remains in the starting position, and therefore, by the shifting forward of the seat part 2, the curvature of the backrest or the profile of the backrest 3 has also changed. In FIG. 2E, the backrest upper part 34 is in a position pivoted back in relation to the starting position by means of the adjustment of the curvature of the backrest, and therefore the curvature of the backrest or profile of the backrest 3 known from the starting position is restored. Furthermore, by means of the change in the angular position of the backrest upper part 34, the orientation of the headrest 4 has also correspondingly changed.

Figure 3:
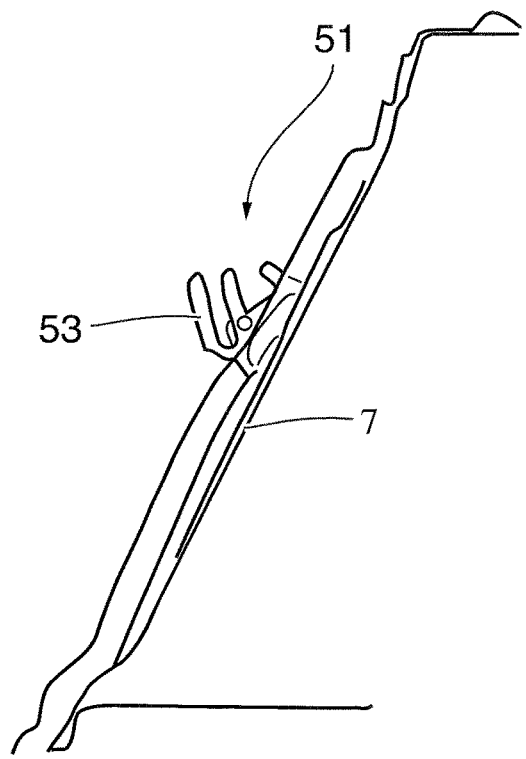

FIG. 3 illustrates a schematic data view of the retaining clamp 51 fastened to a vehicle base 7. The slotted guide 53 which is open on one side and in which the second end of the fourth rocker 50 runs can clearly be seen in this view.

Figure 4:
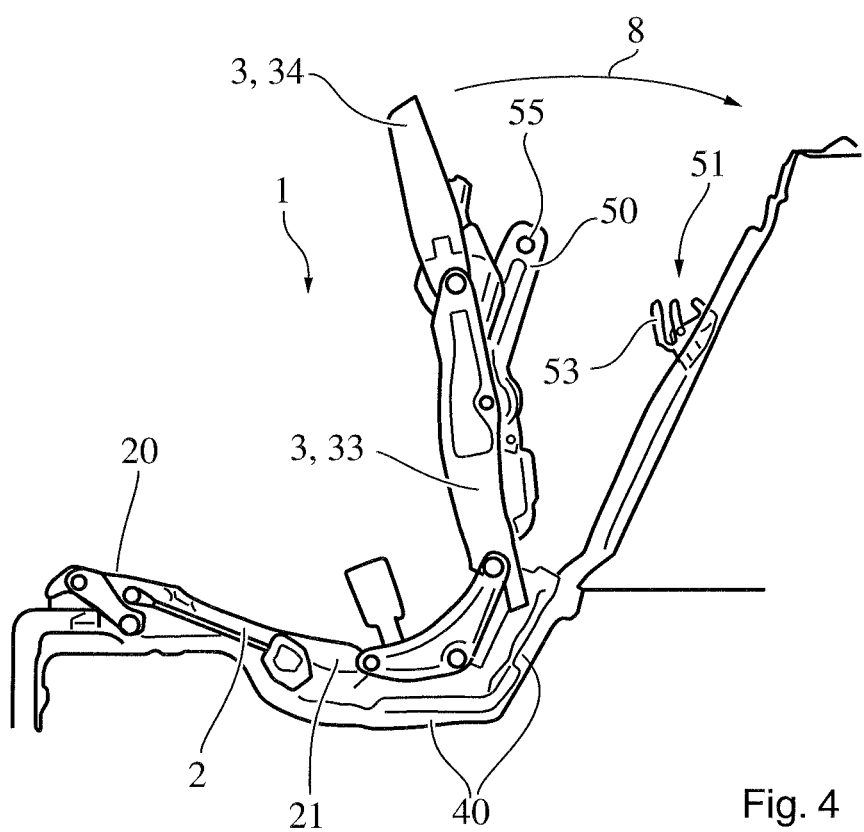

FIG. 4 illustrates the method for mounting the vehicle seat 1 in the vehicle, wherein, in a first step, first of all the vehicle seat 1 is provided in a configuration with a backrest 3 shifted forward, and, in a subsequent, second step, is fastened on the substructure 40. In a subsequent, second step, the backrest 3 is pivoted back within the scope of a pivoting movement 8, and therefore a bolt 55 which is located at the second end of the fourth rocker 50 enters into engagement with the slotted guide 53 which is open on one side. The vehicle seat 1 is subsequently fixed.

LIST OF REFERENCE NUMBERS 1 vehicle seat
2 seat part
3 backrest
4 headrest
5 retaining rod
6 guide bushing
7 vehicle base
8 pivoting movement
20 front part
21 main part
23 slotted guide
24 second rocker
25 holder
26 spindle
31 first rocker
32 drive
33 backrest main part
34 backrest upper part
35 second pivot axis
36 further adjustment unit
37 spindle drive
40 substructure
41 control box
50 fourth rocker
51 retaining lamp
52 adjustment unit
53 further slotted guide
54 axis of rotation
55 bolt
100 direction of travel
101 transverse direction

The invention claimed is:
1. A vehicle seat comprising:
a seat part;
a backrest;
a substructure;
a seat surface inclination adjustment mechanism for adjusting the inclination of a seat surface of the seat part; and
a backrest inclination adjustment mechanism,
wherein the seat part defines the seat surface for a vechicle occupant and comprises a front part and a main part;
wherein the main part is mounted in the manner of a rotary hinge on a first rocker;
wherein a lower side of the front part has a slotted guide in which a first end of a second rocker is mounted in the manner of a rotary hinge about a transverse axis which extends along a transverse direction which is perpendicular to a direction of travel;
wherein the first end is mounted in a longitudinally displaceable manner in the direction of travel in the slotted guide;
wherein a first end of the first rocker is connected rotatably to the main part while a second end of the first rocker is fastened rotatably to the substructure;
wherein the first rocker comprises a longitudinal adjustment until for adjusting the length of the first rocker;
wherein the seat surface inclination adjustment mechanism comprises the second rocker;

wherein the angle of the first rocker in relation to the substructure is changed via a drive, so that the height of the seat part is changed via a change in angle of the first rocker;

wherein the first rocker forms part of a height adjustment mechanism for the vehicle seat;

wherein the position of the second rocker relative to the substructure can be changed via a further drive to change the inclination of the front part, so that the further drive is part of the seat surface inclination adjustment mechanism;

wherein the backrest inclination adjustment mechanism comprises a fourth rocker, a first end of which is connected in the manner of a rotary hinge to the backrest, and a second end of which is connected in the manner of a rotary hinge to a vehicle-mounted retaining clamp;

wherein the first end of the fourth rocker is connected to the backrest about an axis of rotation in the manner of a rotary hinge via an adjustment unit in order to change an angle between the backrest and the fourth rocker and therefore to change the inclination of the backrest;

wherein the second end of the fourth rocker is fastened in a slotted guide of the retaining clamp;

wherein the adjustment unit has a drive for a motor-assisted adjustment of the backrest inclination;

wherein the backrest of the vehicle seat comprises a backrest main part and a backrest upper part;

wherein the backrest main part and the backrest upper part are connected to each other in the manner of a rotary hinge via a common second pivot axis;

wherein the second pivot axis runs parallel to the transverse direction;

wherein the backrest main part and the backrest upper part are coupled to each other in a region of the second pivot axis by means of a further adjustment unit in such a manner that an adjustment of the further adjustment unit brings about a change in the angle between the backrest main part and the backrest upper part about the second pivot axis; and wherein the further adjustment unit is part of an adjustment of the curvature of the backrest.

2. The vehicle seat of claim 1, wherein the first rocker comprises a spindle drive or a piston-cylindr drive for the change in length.

3. The vehicle seat of claim 1, wherein the seat surface inclination adjustment mechanism is configured in such a manner that an adjustment of the inclination at least of a front part of the vehicle seat takes place by a change in length of a spindle and/or by a longitudinal movement of the spindle and/or by a rotation of the second rocker.

4. The vehicle seat of claim 1, wherein the seat surface inclination adjustment mechanism is configured in such a manner that an adjustment of the inclination at least of a front part of the vehicle seat takes place by a change in length of a spindle and/or by a longitudinal movement of the spindle and/or by a rotation of the second rocker.

\* \* \* \* \*

UNITED STATES PATENT AND TRADEMARK OFFICE
CERTIFICATE OF CORRECTION

PATENT NO. : 9,855,864 B2  
APPLICATION NO. : 14/396444  
DATED : January 2, 2018  
INVENTOR(S) : Sascha Müller et al.

Page 1 of 1

It is certified that error appears in the above-identified patent and that said Letters Patent is hereby corrected as shown below:

Column 4, Line 49: Remove "vechicle" and insert --vehicle--

Column 4, Line 65: Remove "until" and insert --unit--

Column 6, Line 16: Remove "piston-cylindr" and insert --piston-cylinder--

Column 6, Line 24: Remove "claim 1" and insert --claim 2--

Signed and Sealed this  
Thirteenth Day of March, 2018

Andrei Iancu  
*Director of the United States Patent and Trademark Office*